US010876491B1

(12) United States Patent
Claude et al.

(10) Patent No.: US 10,876,491 B1
(45) Date of Patent: Dec. 29, 2020

(54) COMPENSATION OF FUEL INJECTION TIMING ERRORS

(71) Applicant: GM GLOBAL TECHNOLOGY OPERATIONS LLC, Detroit, MI (US)

(72) Inventors: Paul Leonardo Claude, Turin (IT); Pietro Orlando, Turin (IT); Andrea Morgando, Borgiallo (IT); Martina Giomi, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/773,402

(22) Filed: Jan. 27, 2020

(51) Int. Cl.
| F02D 41/40 | (2006.01) |
| F02B 9/02 | (2006.01) |
| F02M 55/02 | (2006.01) |
| F02D 41/00 | (2006.01) |
| F02D 41/22 | (2006.01) |
| F02D 41/38 | (2006.01) |

(52) U.S. Cl.
CPC .............. F02D 41/401 (2013.01); F02B 9/02 (2013.01); F02D 41/009 (2013.01); F02D 41/22 (2013.01); F02M 55/025 (2013.01); F02D 2041/224 (2013.01); F02D 2041/389 (2013.01); F02D 2200/0404 (2013.01); F02D 2200/0602 (2013.01)

(58) Field of Classification Search
CPC ...... F02D 41/401; F02D 41/22; F02D 41/009; F02D 2200/0404; F02D 2200/0602; F02D 2041/224; F02D 2041/389; F02B 9/02; F02M 55/025
See application file for complete search history.

(56) References Cited

U.S. PATENT DOCUMENTS

| 9,644,566 | B2 * | 5/2017 | Girotto | .................. F02D 41/40 |
| 10,094,322 | B1 | 10/2018 | Nieddu et al. | |
| 10,288,004 | B2 | 5/2019 | Uehara | |
| 2016/0363075 | A1 * | 12/2016 | Larocca | .............. F02D 41/1456 |
| 2018/0156154 | A1 * | 6/2018 | Hoffmann | ............... F02D 41/22 |

* cited by examiner

*Primary Examiner* — Xiao En Mo
(74) *Attorney, Agent, or Firm* — Quinn IP Law (57) ABSTRACT

A method is provided for adjusting timing of fuel injection into a combustion chamber of a compression-ignition engine. The method includes detecting a request for zero torque generation by the engine and cutting-off delivery of fuel into the combustion chamber during the detected zero torque request. The method additionally includes issuing a command to inject a test quantity of fuel into the combustion chamber during the detected request for zero torque generation. The method also includes assessing a timing delay between the command to inject the test quantity of fuel and a start of the test quantity injection, and determining a compensation for the assessed timing delay. The method additionally includes detecting a request for positive torque generation by the engine. The method further includes commanding a shift in the timing of fuel injection into the combustion chamber by the determined compensation during the engine's positive torque generation.

20 Claims, 4 Drawing Sheets

COMPENSATION OF FUEL INJECTION TIMING ERRORS

INTRODUCTION

The present disclosure is drawn to a system and method for measuring and compensating for fuel injection timing errors in a compression-ignition engine.

Modern internal combustion engines typically employ electronic fuel control to regulate engine output torque. In a spark-ignition or gasoline engine, an amount of air supplied to the engine is controlled via an electronic throttle control (ETC) to establish the amount of injected fuel, and thereby regulate the engine's output torque. On the other hand, in compression-ignition or diesel internal combustion engines, the engine's output torque control is typically accomplished directly via the amount of injected fuel. Additionally, a specific quantity of injected fuel needs to be timed with precision to appropriately regulate the torque output, efficiency, and exhaust emissions of the engine.

SUMMARY

A method is provided for adjusting timing of fuel injection into a combustion chamber of a compression-ignition engine. The method includes detecting, via an electronic controller, a request for zero torque generation by the engine. The method also includes cutting-off, via the electronic controller, delivery of fuel into the combustion chamber during the detected request for zero torque generation. The method additionally includes issuing a command, via the electronic controller, to inject a test quantity of fuel into the combustion chamber during the detected request for zero torque generation. The method also includes assessing, via the electronic controller, a timing error or delay between the issued command to inject the test quantity of fuel and a start of the test quantity injection of fuel. The method further includes compensating, via the electronic controller, for the assessed timing delay via shifting a timing of the command to inject the test quantity of fuel when a request for non-zero torque generation by the engine is detected.

The compression-ignition engine may include a crankshaft configured to reciprocate a piston inside a cylinder and thereby define the combustion chamber, and a crankshaft position sensor in communication with the electronic controller and configured to detect an angular position of the crankshaft. The engine may further include a high-pressure fuel rail configured to supply fuel to the fuel injector, and a fuel pressure sensor in communication with the electronic controller and configured to detect fuel pressure in the fuel rail.

The method may further include determining fuel pressure in the fuel rail while the test quantity of fuel is supplied to the fuel injector. Additionally, the method may include correlating the determined fuel pressure with the angular position of the crankshaft to determine the timing of the command to inject the test quantity of fuel relative to the angular position of the crankshaft.

The method may further include sampling the fuel pressure signals at a frequency greater than or equal to 100 times per stroke of the compression-ignition engine.

Assessing the timing delay may include determining timing of the command to inject the test quantity of fuel relative to a drop in the detected fuel pressure, i.e., actual start of injection into the combustion chamber.

Assessing the timing delay may further include identifying, via the electronic controller, two successive sampled fuel pressure signals from a fuel pressure sensor across the drop in the detected fuel pressure, within a sampling window of the angular position of the crankshaft, and determining a distance between the two successive sampled signals in terms of the angular position of the crankshaft and a midpoint of the distance between the two successive sampled signals.

The compensation for the assessed timing delay may include a shift in timing of the command to inject the test quantity of fuel forward of the determined midpoint.

The method may additionally include assessing, following determining the compensation for the assessed timing delay, whether the drop in the detected fuel pressure remains between the two successive fuel pressure signals.

When the drop in the detected fuel pressure does not remain between the two successive fuel pressure signals, the method may additionally include adjusting the shift in timing of the command to inject the test quantity of fuel forward by a quarter of the determined distance between the two successive sampled fuel pressure signals.

When the drop in the detected fuel pressure remains between the two successive fuel pressure signals, the method may additionally include adjusting the shift in timing of the command to inject the test quantity of fuel back by a quarter of the determined distance between the two successive sampled fuel pressure signals.

The method may additionally include comparing, via the electronic controller, the determined compensation for the assessed timing delay with a target threshold timing delay, and setting a diagnostic trouble code in the motor vehicle when the determined compensation is greater than the target threshold timing delay.

The method may also include storing in a memory of the electronic controller the shifted timing of the command to inject the test quantity of fuel and adjusting a timing of the delivery of fuel into the combustion chamber when a request for non-zero torque generation is detected.

An engine system for a motor vehicle employing an electronic controller programmed with an algorithm and operable to perform the above method is also disclosed.

The above features and advantages and other features and advantages of the present disclosure are readily apparent from the following detailed description of the best modes for carrying out the disclosure when taken in connection with the accompanying drawings.

DETAILED DESCRIPTION

Figure 1:
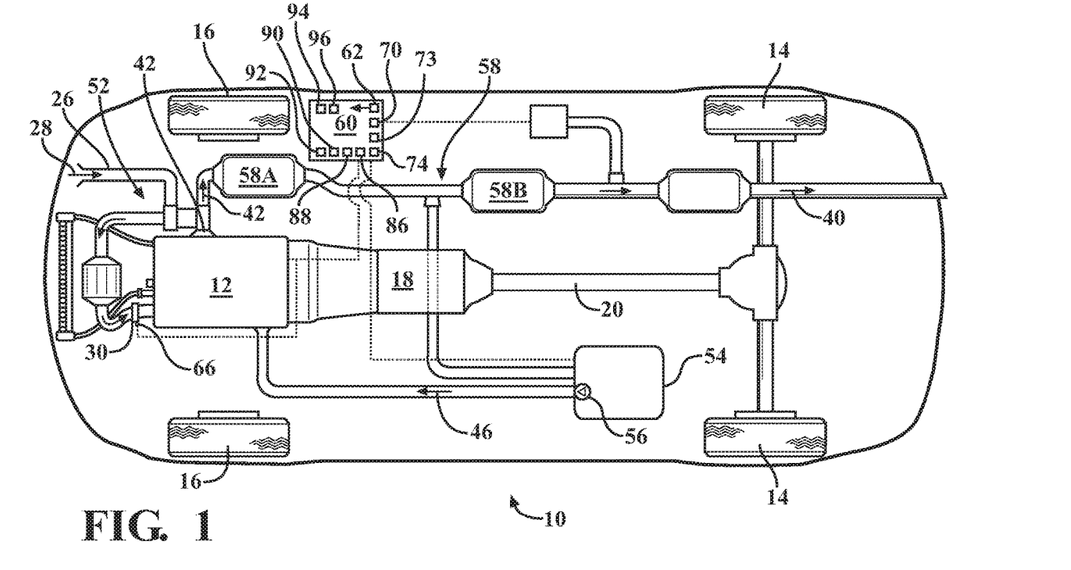
FIG. 1 is a schematic illustration of a vehicle including a compression-ignition internal combustion engine operable by an electronic controller.

Referring to the drawings, wherein like reference numbers refer to like components, FIG. 1 shows a schematic view of a motor vehicle 10. The motor vehicle 10 incorporates a powertrain that includes an internal combustion engine 12. The engine 12 is configured as a compression-ignition or diesel type for generating engine torque. The engine 12 generally applies its torque to the driven wheels 14 and/or 16 through a multi-speed ratio transmission 18 and via a drive or a propeller shaft 20, as shown by an exemplary embodiment in FIG. 1.

Figure 2:
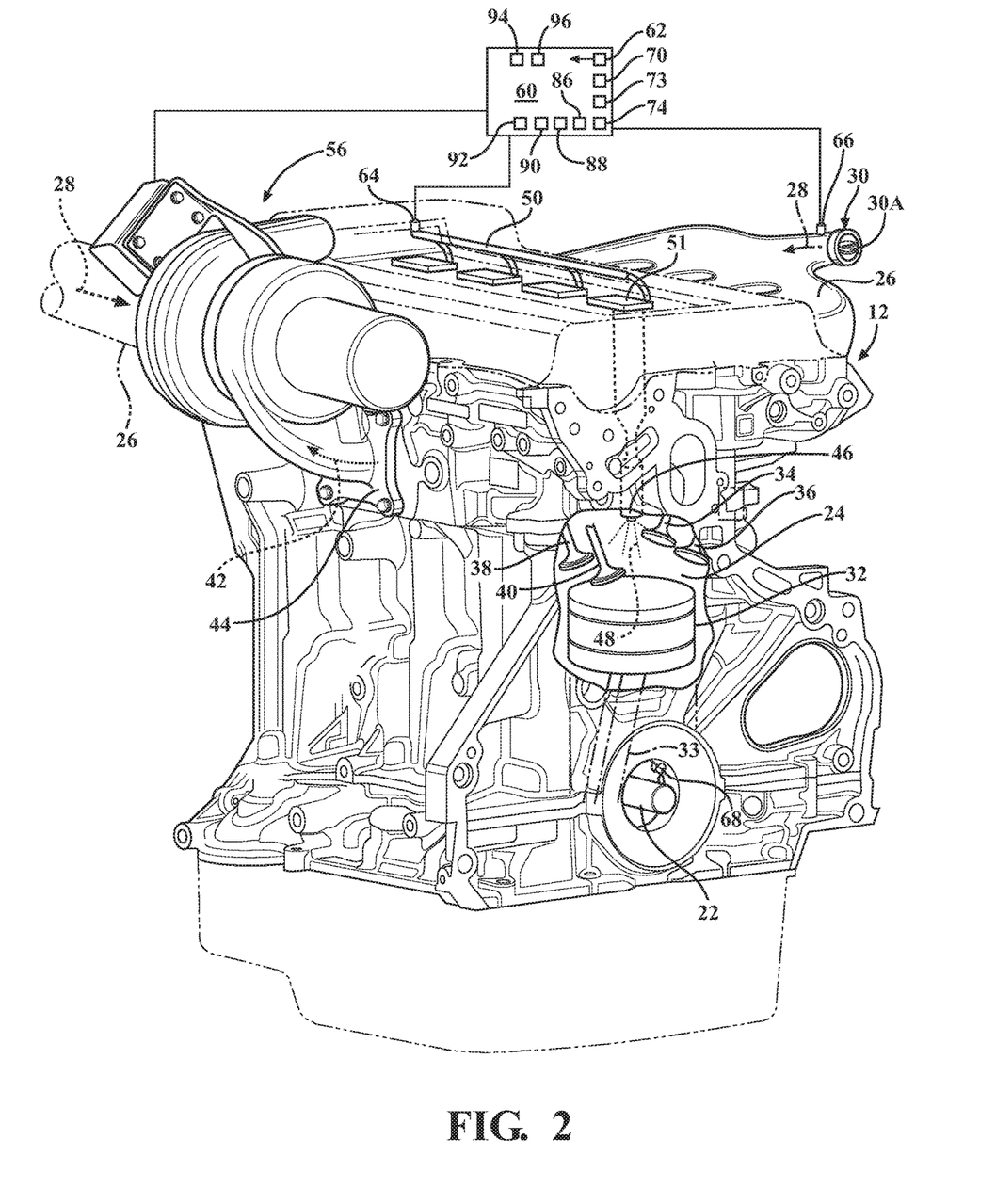
FIG. 2 is a schematic perspective close-up partial view of the engine shown in FIG. 1.

As shown in FIG. 2, the engine 12 includes a crankshaft 22, as well as one or more cylinders, each defining a combustion chamber 24 configured to burn a mixture of fuel and air therein. Although a single combustion chamber 24 is shown, the engine 12 may include as many such combustion chambers as required by the specific design of the engine. The engine 12 also includes an intake passage 26 that is in fluid communication with the combustion chambers 24. The intake passage 26 is configured to deliver a flow of intake air 28 from the atmosphere or ambient to the combustion chambers 24. As shown in FIG. 1, a throttle 30, such as having a moveable throttle blade 30A (shown in FIG. 2), may be positioned at the intake passage 26 and configured to control supply of the flow of intake air 28 delivered to the combustion chambers 24 through the intake passage 26.

As additionally shown in FIG. 2, each combustion chamber 24 also includes a piston 32 and a connecting rod 33. Each piston 32 is configured to reciprocate under the force of combustion inside the respective combustion chamber 24, and thereby rotate the crankshaft 22 via the connecting rod 33 and regulate volume of the combustion chamber. As additionally shown in FIG. 2, each combustion chamber 24 may be provided with a first intake valve 34, a second intake valve 36, a first exhaust valve 38, and a second exhaust valve 40. Each intake valve 34, 36 is configured to control a supply of air or of air and fuel into the respective combustion chamber 24 when the engine 12 is generating torque and powering the vehicle 10. Each exhaust valve 38, 40 is configured to control the removal of a post-combustion exhaust gas 42 from the respective combustion chamber 24 via an exhaust passage 44. Although two intake valves 34, 36 and two exhaust valves 38, 40 are described herein and depicted in the figures, nothing precludes the engine 12 from being equipped with fewer or greater number of intake and exhaust valves.

The engine 12 additionally includes fuel injectors 46. At least one fuel injector 46 is provided for each combustion chamber 24 and is configured to supply a metered amount of fuel 48 for mixing with the flow of intake air 28 and combustion inside the respective combustion chamber 24. The engine 12 additionally includes a high-pressure fuel rail 50 configured to supply the fuel 48 to each fuel injector 46. The fuel injector 46 is typically operated by a fuel injector driver 51 in response to a signal received from an electronic controller, which will be described in greater detail below. The fuel rail is supplied with fuel via a fuel pump 52 connected to a fuel reservoir or tank 54. Although the diesel engine 12 is shown as having the previously discussed throttle blade 30A, the engine may be configured to operate without such a throttle blade. In such a diesel engine configuration, combustion inside the combustion chambers 24 is controlled via the amount of fuel introduced by the respective fuel injectors 46 into the particular combustion chambers, wherein the injected fuel becomes combined with the air drawn into the particular combustion chambers by the respective pistons 31.

As shown in FIGS. 1 and 2, the engine 12 may additionally include a turbocharger 56 positioned at the intake passage 26 and configured to pressurize the flow of intake air 28 prior to the delivery of the intake airflow to the combustion chambers 24. Although the turbocharger 56 is shown, nothing precludes the engine 12 from being configured and operated without such a power augmentation device. The exhaust passage 44 is configured to channel the exhaust gas 42 from the combustion chambers 24 to the turbocharger 56 for pressurizing the flow of intake air 28 and subsequent channeling of the exhaust gas to an exhaust system 58. Injection of the fuel 48 via the injectors 46 is coordinated with the operation of the turbocharger 56. As shown, the exhaust system 58 typically includes after-treatment devices or catalysts, indicated generally via numerals 58A and 58B, configured to methodically remove largely carbonaceous particulate byproducts of engine combustion from the exhaust gas 42 and reduce emissions of such particulates into the atmosphere.

With continued reference to FIGS. 1 and 2, the vehicle 10 also includes an electronic controller 60, such as an engine control unit (ECU) or module (ECM), configured, i.e., structured and programmed, to regulate the operation of the engine 12 along with the operation of the turbocharger 56. The controller 60 is part of a motor vehicle engine system and includes a memory that is tangible and non-transitory. The memory may be a recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 60 may also include a flexible disk, hard disk, magnetic tape, other magnetic medium, a CD-ROM, DVD, other optical medium, etc. The controller 60 is equipped with an internal clock 62, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 60 or accessible thereby may be stored in the memory and automatically executed to provide the required functionality.

The controller 60 is in electronic communication with the fuel injectors 46, and configured to command delivery of fuel 48 into the combustion chambers 24 at specific timing intervals to support requested operation of the engine 12 while powering the vehicle 10. The engine 12 also includes a fuel pressure sensor 64 operatively connected to the fuel rail 50 and in electronic communication with the controller 60. The vehicle 10 includes a throttle switch 66, such as a gas pedal equipped with a throttle position sensor, configured to request torque generation by the engine 12. The throttle switch 66 is in electronic communication with the controller 60. The controller 60 is configured to detect, via the throttle switch 66, a request for zero torque generation by the engine 12. The request for zero torque generation by the engine 12, e.g., a determination that the vehicle operator has fully released the gas pedal, is specifically detected while the engine speed is above idle, which may be detected by an engine speed sensor (not shown), resulting in the vehicle 10 being in a coast down mode. The controller 60 is also configured to cut-off or shut down delivery of fuel 48 into the combustion chambers 24, via closing the injectors 46, during the detected request for zero torque generation by the engine 12.

As shown in FIG. 2, the engine 12 may include a crankshaft position sensor 68 configured to detect instantaneous angular position θ of the crankshaft 22 and communicate to the controller 60 high-frequency pressure signals indicative thereof. After the fuel cut-off, during the detected request for zero torque generation by the engine 12, has been implemented, and using the signals from the crankshaft position sensor 68, the controller 60 is configured to issue a command 70 to inject a test quantity 72 of fuel 48 at specific timing 73 (shown in FIGS. 1-3) relative to the angular position θ of the crankshaft 22, into a respective combustion chamber 24 via a corresponding fuel injector 46. Within the meaning of the present disclosure, the "test quantity of fuel" denotes a minimal amount of fuel 48, which will not generate a level of combustion sufficient to cause a flare-up in engine output torque and a disruption in the intended coast down of the vehicle 10, as sensed by vehicle operator. The controller 60 may be configured to determine, via the fuel pressure sensor 64, a fuel pressure 64A in the fuel rail 50 while the test quantity 72 of fuel 48 is being injected. The electronic controller 60 may also be configured to correlate the determined fuel pressure 64A with the instantaneous angular position θ of the crankshaft 22 to determine the timing of the command 70 to inject the test quantity 72 of fuel relative to the angular position θ of the crankshaft 22.

Figure 3:
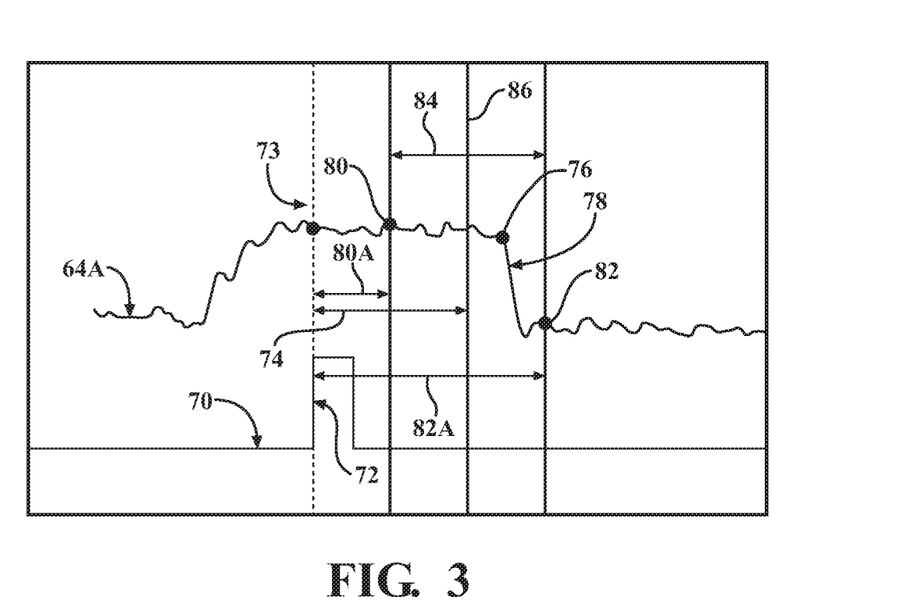
FIG. 3 is a chart illustrating an exemplary plot of a fuel injection pulse commanded via the electronic controller depicted in FIGS. 1-2 versus fuel injector rail pressure; specifically depicting a timing error between the issued injection command and a start of the injection.

As shown in FIG. 3, the controller 60 is additionally configured to assess a timing error or delay 74, using the internal clock 62, between the issued command to inject the test quantity 72 of fuel 48 and an actual start 76 of the test quantity injection of fuel. The timing delay 74 may be indicative of a mechanical fault or wear in the injector 46, the fuel injector driver 51, or another device external to the ECU or ECM. Such a timing delay 74 may adversely affect intended operation of the after-treatment devices in the exhaust system 58 and the exhaust emissions. Therefore, the timing delay 74 is indicative of the general delay between issued commands to inject fuel 48 into the combustion chamber 24 and actual start 76 of injection of fuel. The actual start 76 of fuel injection, i.e., when a specific fuel injector 46 begins spraying fuel 48 into the combustion chamber 24 may be discerned from a detected drop 78 in the fuel pressure 64A within the fuel rail 50. Accordingly, to assess the timing delay 74, the controller 60 may be configured to determine timing of the command 70 to inject the test quantity 72 of fuel 48 relative to the detected fuel pressure drop 78.

To assess the timing delay, the controller 60 may be additionally configured to identify two successive fuel pressure signals across the drop 78, such as signals 80 and 82 (shown in FIGS. 3-5) within a sampling window $\theta_S$ of the angular position θ of the crankshaft, in the detected fuel pressure 64A. The controller 60 may be further programmed to determine a distance 84 between the two successive sampled signals 80 and 82 in terms of the angular position θ of the crankshaft 22, i.e., within the sampling window $\theta_S$.

Figure 4:
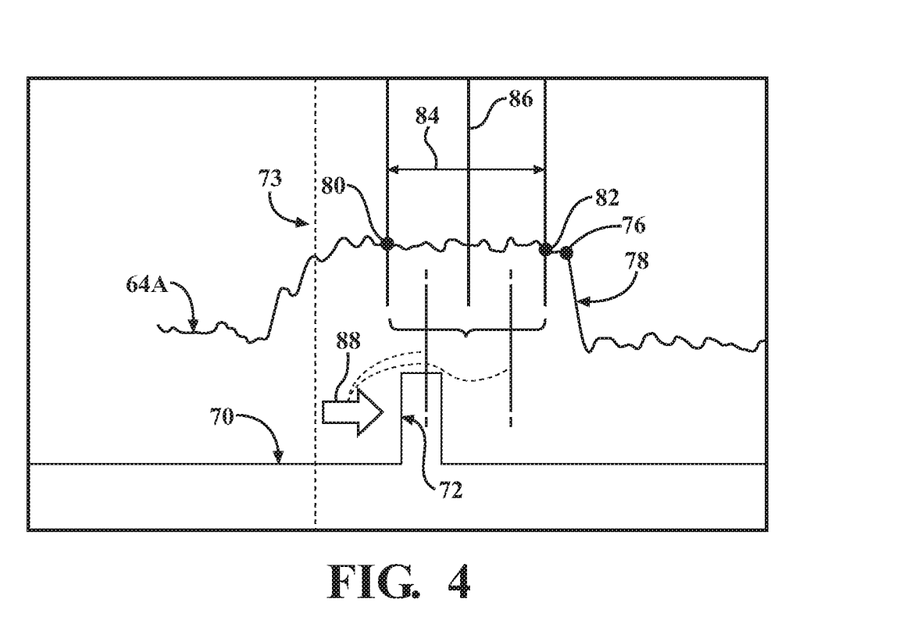
FIG. 4 is a chart illustrating an exemplary plot of the fuel injection pulse commanded via the electronic controller versus fuel injector rail pressure; specifically depicting an interim shift in injection timing compensating for the timing error, according to the present disclosure.
Figure 5:
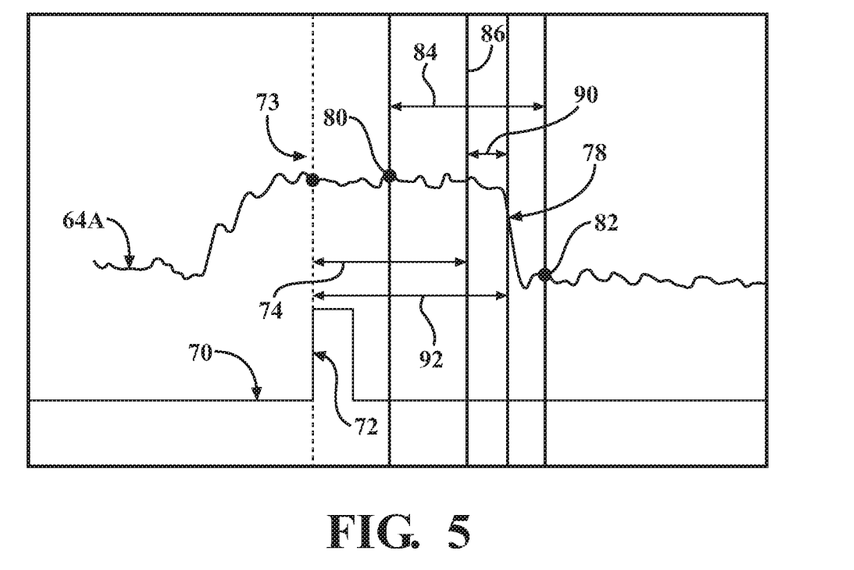
FIG. 5 is a chart illustrating an exemplary plot of the fuel injection pulse commanded via the electronic controller versus fuel injector rail pressure; specifically depicting the start of injection following a final shift in injection timing compensating for the timing error, according to the present disclosure.

Additionally, the controller 60 may then determine a midpoint 86 between the two successive signals 80 and 82 in terms of the crankshaft angular position θ. Accordingly, the midpoint 86 between the two successive signals 80 and 82 of the assessed timing delay 74 is the average value of distance 80A from the initial timing of the command 70 to inject the test quantity 72 of fuel to the timing of the fuel pressure signal 80 and distance 82A from the initial timing of the command 70 to the fuel pressure signal 82. The electronic controller 60 may be configured to sample and buffer signals indicative of the fuel pressure 64A detected by the fuel pressure sensor 64. To facilitate a sufficiently narrow sampling window $\theta_S$ resulting in an efficient and robust compensation of the timing delay 74, the controller 60 may be configured to sample the fuel pressure 64A signals at a frequency greater than or equal to 100 times per stroke of the engine 12.

In mathematical terms, the relationship between the distances to determine the timing delay 74 (to the midpoint 86) in the first step of the compensation strategy is defined as follows:

$$\text{"74"} = \frac{\text{"80A"} + \text{"82A"}}{2}$$

After the first step, the controller 60 may also be configured to move the command 70 to inject the test quantity 72 of fuel forward by half of the distance 84 within the sampling window $\theta_S$, indicated as shift 88 (shown in FIG. 4). The controller 60 may be additionally configured to assess, following the shift 88 of the command 70 to inject the test quantity 72, whether the drop 78 in the detected fuel pressure 64A remains between the two successive sampled fuel pressure signals 80, 82.

In the event the drop 78 in the detected fuel pressure 64A does not remain between the two successive sampled fuel pressure signals 80, 82, i.e., falls outside the two successive fuel pressure signals, the controller 60 may additionally adjust the determined change in the timing of the command 70 to the midpoint 86 forward by a quarter of the determined distance 84 between the two successive sampled signals (shown in FIG. 4). In the event the drop 78 in the detected fuel pressure 64A remains between the two successive sampled fuel pressure signals 80, 82, the controller 60 may adjust the determined change in the timing of the command 70 to the midpoint 86 back by a quarter of the determined distance 84 between the two successive sampled signals, i.e., distance 90 shown in FIG. 5. Employing the above compensation technique, the controller 60 may identify new timing for issuance of the command 70, such that the actual injection of fuel 48 occurs at the optimal instantaneous position θ of the crankshaft 22. Accordingly, FIG. 4 represents a second step of the compensation strategy, in which the timing of the command 70 to inject the test quantity 72 is moved forward of 88 to determine compensation for the timing delay 74, i.e., a final shift 92 shown in FIG. 5. In mathematical terms, the relationship between the distances in the second step of the compensation strategy is defined as follows:

$$\text{"92"} = \text{"74"} \pm \left(\frac{\text{"84"}}{4}\right)$$

The controller 60 may be additionally configured to store in its non-volatile memory thus determined compensation for the timing delay 74 as the final shift 92 in timing of the command 70 while the engine 12 operates in the zero torque generation, and then release the command for the final shift 92 during non-zero, i.e., positive, torque generation by the engine 12. Therefore, the controller 60 commands the final shift 92 in the timing of fuel injection when the engine 12 is called upon to generate positive torque for powering the vehicle 10. Furthermore, the controller 60 may be configured to compare the determined final shift 92 with a threshold timing delay 94 and set a diagnostic trouble code 96 to inform the operator of vehicle 10 or a service technician when thus determined compensation for the timing delay is greater than the threshold timing delay 94. Such a diagnostic trouble code 96 may then be used as an indicator that the engine's fuel system and its attendant components, such as the injectors 46, may need servicing or replacement.

Figure 6:
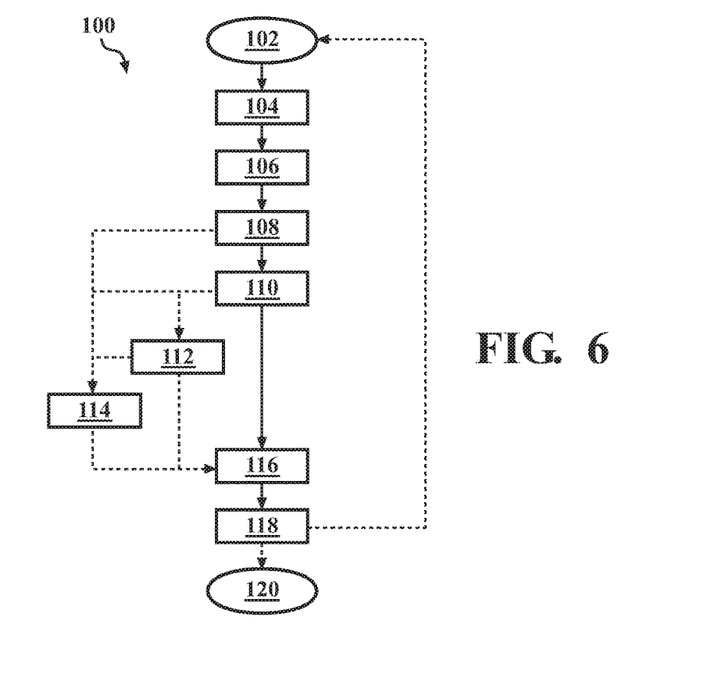
FIG. 6 is a flow diagram of a method of operating the compression-ignition engine via the electronic controller depicted in FIGS. 1-5.

FIG. 6 depicts a method 100 of operating the compression-ignition engine 12 embodied in an algorithm programmed into the electronic controller 60. The method 100 is specifically envisioned as a remedial measure intended to compensate for a timing delay between commanded injection of fuel 48 and the actual start of the injection, as described above with respect to FIGS. 1-5. To compensate for such a delay, the method 100 includes adjusting timing of fuel injection into the engine's combustion chamber 24 as follows. The method 100 commences in frame 102 with detecting the request for zero torque generation by the engine 12 via the controller 60 in communication with the throttle switch 66.

Following frame 102, the method 100 proceeds to frame 104. In frame 104 the method includes cutting-off delivery of fuel 48, via the fuel injector 46, into the combustion chamber 24 during the detected request for zero torque generation provided by the engine 12. Accordingly, by being run specifically when there is no request for positive torque generation by the engine 12 and while the vehicle 10 is in coast down mode, operation of the method 100 is intended to be non-intrusive, i.e., not be perceived by the vehicle's operator and other vehicle occupants.

Following frame 104, in frame 106 the method includes issuing the command 70, via the controller 60, during the detected request for zero torque generation by the engine 12, to inject, at a given crankshaft angular position $\theta$, the test quantity 72 of fuel 48 into the combustion chamber 24. After frame 106 the method advances to frame 108. In frame 108, the method includes assessing, via the controller 60, the timing delay 74 between the issued command 70 to inject the test quantity 72 of fuel and the actual start 76 of the test quantity injection. In frame 108 assessing the timing delay may also include determining fuel pressure 64A in the fuel rail 50, as detected via the fuel pressure sensor 64, while the test quantity 72 of fuel is being injected into the combustion chamber 24.

In frame 108 the method may additionally include correlating, via the electronic controller 60, the determined fuel pressure 64A with instantaneous angular position $\theta$ of the crankshaft 22 to determine the timing of the command 70 to inject the test quantity 72 of fuel relative to the crankshaft's angular position. Furthermore, assessing the timing delay may include determining timing of the command 70 to inject the test quantity 72 of fuel relative to the drop 78 in the detected fuel pressure 64A indicative of the start of injection. As described above with respect to FIGS. 1-5, assessing the timing delay may further include identifying, via the electronic controller 60, two successive fuel pressure signals, e.g., the signals 80, 82, from the fuel pressure sensor 64 across the fuel pressure drop 78. Additionally, assessing the timing delay in frame 108 may include determining the distance 84 between the two successive sampled signals 80, 82 within the sampling window $\theta_S$ (in terms of the angular position $\theta$ of the crankshaft 22) and the midpoint 86.

After frame 108, the method advances to frame 110, where it includes determining a compensation for the assessed timing delay 74. Determining the compensation for the assessed timing delay 74 may include determining or calculating the shift 88 of the command 70 to inject the test quantity 72 of fuel into the combustion chamber 24, that is equal to half of the distance 84. According to the method, as part of frame 110, the method may also include assessing whether the drop 78 in the detected fuel pressure 64A remains between the two successive fuel pressure signals 80, 82.

As described with respect to FIGS. 1-5, when the drop in the detected fuel pressure 64A falls outside the two successive fuel pressure signals 80, 82, the method may include adjusting the shift in timing 74 of the command 70 to inject the test quantity 72 of fuel forward by a quarter of the determined distance 84. On the other hand, when the drop 78 in the detected fuel pressure 64A remains between the two successive fuel pressure signals 80, 82, the method may include adjusting the shift 74 in timing of the command 70 back by a quarter of the determined distance 84. After frame 110, the method may advance to frame 112 where the method may include storing in the memory of the controller 60 the final shift 92 in timing of the command 70.

After either of the frames 108-112, the method may advance to frame 114 for comparing, via the electronic controller 60, the determined final shift 92 for timing delay 74 with the threshold timing delay 94, and setting a diagnostic trouble code 96 when the determined final shift is greater than the threshold timing delay. Following either frame 110 or 112, the method advances to frame 116. In frame 116 the method includes detecting, by the controller 60, the request for positive torque generation by the engine 12. After frame 116, the method advances to frame 118, where the method includes commanding the final shift 92 in the timing of fuel injection into the combustion chamber 24 by the determined compensation after the request for positive torque generation by the engine 12 has been detected.

Thus, the method 100 is intended to compensate for the assessed timing delay 74 between an issued command to inject fuel 48 and an actual start of corresponding injection of fuel into the respective combustion chamber 24. As such, the method 100 may counteract the otherwise adverse effect of the timing delay 74 on intended operation of the aftertreatment devices in the exhaust system 58. Following either of the frames 116-118, the method may conclude in frame 120, or loop back to frame 102 for continued monitoring of the throttle switch 66 and detection of another request for zero torque generation by the engine 12 via the controller 60.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of adjusting timing of fuel injection into a combustion chamber of a compression-ignition engine, the method comprising:
    detecting, via an electronic controller, a request for zero torque generation by the engine;
    cutting-off, via the electronic controller, delivery of fuel into the combustion chamber during the detected request for zero torque generation;
    issuing a command, via the electronic controller, to inject a test quantity of fuel into the combustion chamber during the detected request for zero torque generation;
    assessing, via the electronic controller, a timing delay between the issued command to inject the test quantity of fuel and a start of the test quantity injection of fuel;
    determining, via the electronic controller, a compensation for the assessed timing delay;
    detecting, via the electronic controller, a request for positive torque generation by the engine; and
    commanding, via the electronic controller, a shift in the timing of fuel injection into the combustion chamber by the determined compensation during positive torque generation by the engine.

2. The method of claim 1, wherein the compression-ignition engine includes a crankshaft configured to reciprocate a piston inside a cylinder and thereby define the combustion chamber, a high-pressure fuel rail configured to supply fuel to the fuel injector, a fuel pressure sensor in communication with the electronic controller and configured to detect fuel pressure in the fuel rail, and a crankshaft position sensor in communication with the electronic controller and configured to detect an angular position of the crankshaft, the method further comprising:
    determining fuel pressure in the fuel rail, via the electronic controller, while the test quantity of fuel is supplied to the fuel injector; and
    correlating, via the electronic controller, the determined fuel pressure with the angular position of the crankshaft to determine the timing of the command to inject the test quantity of fuel relative to the angular position of the crankshaft.

3. The method of claim 2, further comprising sampling the fuel pressure signals at a frequency greater than or equal to 100 times per stroke of the compression-ignition engine.

4. The method of claim 2, wherein assessing the timing delay includes determining timing of the command to inject the test quantity of fuel relative to a drop in the detected fuel pressure.

5. The method of claim 4, wherein assessing the timing delay further includes identifying, via the electronic controller, two successive fuel pressure signals from a fuel pressure sensor across the drop in the detected fuel pressure, within a sampling window of the angular position of the crankshaft, and determining a distance between the two successive sampled signals in terms of the angular position of the crankshaft and a midpoint of the distance between the two successive sampled signals, and wherein the compensation for the assessed timing delay includes changing the timing of the command to inject the test quantity of fuel forward of the determined midpoint.

6. The method of claim 5, following determining the compensation for the assessed timing delay, further comprising assessing whether the drop in the detected fuel pressure remains between the two successive fuel pressure signals.

7. The method of claim 6, wherein the compensation for the assessed timing delay further includes adjusting the changed timing of the command to inject the test quantity of fuel forward by a quarter of the determined distance between the two successive fuel pressure signals when the drop in the detected fuel pressure does not remain between the two successive fuel pressure signals.

8. The method of claim 6, further comprising adjusting the changed timing of the command to inject the test quantity of fuel back by a quarter of the determined distance between the two successive fuel pressure signals when the drop in the detected fuel pressure remains between the two successive fuel pressure signals.

9. The method of claim 1, further comprising comparing, via the electronic controller, the determined compensation for the assessed timing delay with a target threshold timing delay and setting a diagnostic trouble code in the motor vehicle when the determined compensation is greater than the target threshold timing delay.

10. A motor vehicle engine system comprising:
    a compression-ignition engine configured to generate engine torque and having a combustion chamber and a throttle switch configured to request torque generation by the engine; and
    an electronic controller in communication with the throttle switch and configured to:
        detect a request for zero torque generation by the engine;
        cut-off delivery of fuel into the combustion chamber during the detected request for zero torque generation;
        issue a command to inject a test quantity of fuel into the combustion chamber during the detected request for zero torque generation;
        assess a timing delay between the issued command to inject the test quantity of fuel and a start of the test quantity injection of fuel;
        determine a compensation for the assessed timing delay;
        detecting a request for positive torque generation by the engine; and
        command a shift in the timing of fuel injection into the combustion chamber by the determined compensation during positive torque generation by the engine.

11. The motor vehicle engine system of claim 10, wherein the compression-ignition engine includes a crankshaft configured to reciprocate a piston inside a cylinder and thereby define the combustion chamber, a high-pressure fuel rail configured to supply fuel to the fuel injector, a fuel pressure sensor in communication with the electronic controller and configured to detect fuel pressure in the fuel rail, and a crankshaft position sensor in communication with the electronic controller and configured to detect an angular position of the crankshaft, and wherein the electronic controller is further configured to:
    determine, via the electronic controller, the fuel pressure in the fuel rail while the test quantity of fuel is supplied to the fuel injector; and
    correlate, via the electronic controller, the determined fuel pressure with the angular position of the crankshaft to determine the timing of the command to inject the test quantity of fuel relative to the angular position of the crankshaft.

12. The motor vehicle engine system of claim 11, wherein the electronic controller is additionally configured to sample the fuel pressure signals at a frequency greater than or equal to 100 times per stroke of the compression-ignition engine.

13. The motor vehicle engine system of claim 12, wherein, to assess the timing delay, the electronic controller is further configured to determine timing of the command to inject the test quantity of fuel relative to a drop in the detected fuel pressure.

14. The motor vehicle engine system of claim 13, wherein, to assess the timing delay, the electronic controller is further configured to identify two successive fuel pressure signals from the fuel pressure sensor across the drop in the detected fuel pressure, within a sampling window of the angular position of the crankshaft, and determine a distance between the two successive sampled fuel pressure signals in terms of the angular position of the crankshaft and a midpoint of the distance between the two successive sampled signals, and wherein to determine the compensation for the assessed timing delay, the electronic controller is configured to change the timing of the command to inject the test quantity of fuel forward of the determined midpoint.

15. The motor vehicle engine system of claim 14, wherein the electronic controller is additionally configured to assess, after the compensation for the assessed timing delay is determined, whether the drop in the detected fuel pressure remains between the two successive fuel pressure signals.

16. The motor vehicle engine system of claim 15, wherein the electronic controller is further configured to adjust the changed timing of the command to inject the test quantity of fuel forward by a quarter of the determined distance between the two successive fuel pressure signals when the drop in the detected fuel pressure does not remain between the two successive fuel pressure signals.

17. The motor vehicle engine system of claim 15, wherein the electronic controller is further configured to adjust the changed timing of the command to inject the test quantity of fuel back by a quarter of the determined distance between the two successive fuel pressure signals when the drop in the detected fuel pressure remains between the two successive fuel pressure signals.

18. The motor vehicle engine system of claim 11, wherein the electronic controller is additionally configured to compare the determined compensation for the assessed timing delay with a target threshold timing delay and set a diagnostic trouble code in the motor vehicle when the determined compensation is greater than the target threshold timing delay.

19. An electronic controller for a motor vehicle including a compression-ignition engine configured to generate engine torque and having a combustion chamber and a throttle switch configured to request torque generation by the engine, the electronic controller being in communication with the throttle switch and programmed with an algorithm comprising:
  detecting a request for zero torque generation by the engine;
  cutting-off delivery of fuel into the combustion chamber during the detected request for zero torque generation;
  issuing a command to inject a test quantity of fuel into the combustion chamber during the detected request for zero torque generation;
  assessing a timing delay between the issued command to inject the test quantity of fuel and a start of the test quantity injection of fuel;
  determining a compensation for the assessed timing delay;
  detecting a request for positive torque generation by the engine; and
  commanding a shift in the timing of fuel injection into the combustion chamber by the determined compensation during positive torque generation by the engine.

20. The electronic controller of claim 19, wherein the compression-ignition engine includes a crankshaft configured to reciprocate a piston inside a cylinder and thereby define the combustion chamber, a high-pressure fuel rail configured to supply fuel to the fuel injector, a fuel pressure sensor in communication with the electronic controller and configured to detect fuel pressure in the fuel rail, and a crankshaft position sensor in communication with the electronic controller and configured to detect an angular position of the crankshaft, the algorithm further comprising:
  determining the fuel pressure in the fuel rail while the test quantity of fuel is supplied to the fuel injector; and
  correlating the determined fuel pressure with the angular position of the crankshaft to determine the timing of the command to inject the test quantity of fuel relative to the angular position of the crankshaft;
  wherein assessing the timing delay includes:
    determining timing of the command to inject the test quantity of fuel relative to a drop in the detected fuel pressure; and
    identifying, via the electronic controller, two successive fuel pressure signals from a fuel pressure sensor across the drop in the detected fuel pressure, within a sampling window of the angular position of the crankshaft, and determining a distance between the two successive sampled signals in terms of the angular position of the crankshaft and a midpoint of the distance between the two successive sampled signals; and
  wherein the compensation for the assessed timing delay includes changing the timing of the command to inject the test quantity of fuel forward of the determined midpoint.

* * * * *